US010107662B2

(12) United States Patent
Cook et al.

(10) Patent No.: US 10,107,662 B2
(45) Date of Patent: Oct. 23, 2018

(54) SENSOR ASSEMBLY

(71) Applicant: Honeywell International Inc., Morristown, NJ (US)

(72) Inventors: James Cook, Freeport, IL (US); Craig S. Becke, South Vienna, OH (US); Jamie Speldrich, Freeport, IL (US)

(73) Assignee: Honeywell International Inc., Morris Plains, NJ (US)

( * ) Notice: Subject to any disclaimer, the term of this patent is extended or adjusted under 35 U.S.C. 154(b) by 167 days.

(21) Appl. No.: 14/610,957

(22) Filed: Jan. 30, 2015

(65) Prior Publication Data
US 2016/0223379 A1   Aug. 4, 2016

(51) Int. Cl.
| G01F 3/12 | (2006.01) |
| G01F 15/00 | (2006.01) |
| G01F 15/06 | (2006.01) |
| G01F 1/684 | (2006.01) |
| G01F 1/692 | (2006.01) |

(52) U.S. Cl.
CPC ............ *G01F 15/006* (2013.01); *G01F 1/684* (2013.01); *G01F 1/692* (2013.01)

(58) Field of Classification Search
CPC ...... G01F 15/006; G01F 15/185; G01F 1/684; G01F 1/692
USPC .................................. 73/272 R, 273, 204.26
See application file for complete search history.

(56) References Cited

U.S. PATENT DOCUMENTS

| 4,320,655 | A |   | 3/1982  | Kammermaier et al. |
| 4,548,078 | A |   | 10/1985 | Bohrer et al. |
| 4,763,098 | A |   | 8/1988  | Glenn et al. |
| 4,829,818 | A | * | 5/1989  | Bohrer ............... G01F 15/14 73/204.22 |

(Continued)

FOREIGN PATENT DOCUMENTS

| CN | 202102009 U | 1/2012 |
| CN | 102072967 B | 9/2012 |

(Continued)

OTHER PUBLICATIONS

Pan et al., "Flip Chip Electrical Interconnection by Selective Electroplating and Bonding," Microsystem Technologies, vol. 10, pp. 7-10, 2003.

(Continued)

*Primary Examiner* — Lisa Caputo
*Assistant Examiner* — Roger Hernandez-Prewit
(74) *Attorney, Agent, or Firm* — Seager Tufte & Wickhem LLP (57) ABSTRACT

A sensor may include a substrate defining a flow channel that extends through the substrate, and a plurality of bond pads on the substrate. A first housing may be disposed along the substrate and may permit at least some fluid to flow from a fluid inlet to a fluid outlet along at least part of the flow channel. A second housing may be disposed along the substrate. A sense die may be disposed between the second housing and the substrate and may include a sensing side facing the substrate with a sense element in registration with the flow channel and a plurality of bond pads on the sensing side that are in registration with, and bump bonded to, the plurality of bond pads on the substrate. An adhesive or other material may be disposed between the sensing side of the sense die and the substrate.

19 Claims, 9 Drawing Sheets

(56) References Cited

U.S. PATENT DOCUMENTS

| | | | |
|---|---|---|---|
| 5,086,745 A | 2/1992 | Nishimura et al. | |
| 5,164,328 A * | 11/1992 | Dunn et al. | G01P 15/0802 |
| | | | 257/E25.029 |
| 5,233,868 A | 8/1993 | Coats et al. | |
| 5,322,816 A | 6/1994 | Pinter | |
| 5,407,501 A | 4/1995 | Koen et al. | |
| 5,459,351 A | 10/1995 | Bender | |
| 5,511,428 A | 4/1996 | Goldberg et al. | |
| 5,581,038 A | 12/1996 | Lampropoulos et al. | |
| 5,620,929 A | 4/1997 | Hosoi et al. | |
| 6,006,607 A | 12/1999 | Bryzek et al. | |
| 6,049,130 A * | 4/2000 | Hosomi et al. | H01L 23/49572 |
| | | | 257/736 |
| 6,076,409 A | 6/2000 | Bang | |
| 6,107,109 A | 8/2000 | Akram et al. | |
| 6,140,144 A | 10/2000 | Najafi et al. | |
| 6,184,773 B1 | 2/2001 | Bonne et al. | |
| 6,294,837 B1 | 9/2001 | Akram et al. | |
| 6,308,553 B1 | 10/2001 | Bonne et al. | |
| 6,311,561 B1 | 11/2001 | Bang et al. | |
| 6,313,529 B1 | 11/2001 | Yoshihara et al. | |
| 6,346,742 B1 | 2/2002 | Bryzek et al. | |
| 6,351,390 B1 | 2/2002 | Mayer et al. | |
| 6,351,996 B1 | 3/2002 | Nasiri et al. | |
| 6,405,597 B1 | 6/2002 | Brouwer et al. | |
| 6,460,411 B1 | 10/2002 | Kersjes et al. | |
| 6,495,452 B1 | 12/2002 | Shih | |
| 6,548,895 B1 | 4/2003 | Benavides et al. | |
| 6,553,808 B2 | 4/2003 | Bonne et al. | |
| 6,555,414 B1 | 4/2003 | Vanfleteren et al. | |
| 6,644,125 B1 | 11/2003 | Siess et al. | |
| 6,684,694 B2 | 2/2004 | Fujiwara et al. | |
| 6,698,283 B2 | 3/2004 | Wado et al. | |
| 6,716,737 B2 | 4/2004 | Plas et al. | |
| 6,732,588 B1 | 5/2004 | Mullenborn et al. | |
| 6,790,775 B2 | 9/2004 | Fartash | |
| 6,794,981 B2 | 9/2004 | Padmanabhan et al. | |
| 6,844,606 B2 | 1/2005 | Logsdon et al. | |
| 6,927,482 B1 | 8/2005 | Kim et al. | |
| 7,037,805 B2 | 5/2006 | DCamp et al. | |
| 7,060,197 B2 | 6/2006 | Fuertsch et al. | |
| 7,141,869 B2 | 11/2006 | Kim et al. | |
| 7,150,195 B2 | 12/2006 | Jacobsen et al. | |
| 7,242,065 B2 | 7/2007 | Kondo et al. | |
| 7,258,003 B2 | 8/2007 | Padmanabhan et al. | |
| 7,303,400 B2 * | 12/2007 | Sun et al. | H01L 23/49816 |
| | | | 257/734 |
| 7,384,818 B2 | 6/2008 | Kim et al. | |
| 7,401,525 B2 | 7/2008 | Cobianu et al. | |
| 7,538,401 B2 | 5/2009 | Eriksen et al. | |
| 7,700,414 B1 | 4/2010 | San Antonio et al. | |
| 7,732,915 B2 | 6/2010 | Dangelmaier et al. | |
| 7,755,466 B2 | 7/2010 | Beck et al. | |
| 8,061,212 B2 | 11/2011 | Shubert | |
| 8,372,674 B2 | 2/2013 | Cobianu et al. | |
| 8,418,549 B2 * | 4/2013 | Speldrich et al. | G01F 5/00 |
| | | | 73/202.5 |
| 8,559,185 B2 | 10/2013 | Lee et al. | |
| 8,698,258 B2 | 4/2014 | Nagarkar et al. | |
| 8,709,866 B2 | 4/2014 | Fee et al. | |
| 8,806,964 B2 | 8/2014 | Thanigachalam et al. | |
| 2004/0099057 A1 | 5/2004 | Hornung et al. | |
| 2004/0259325 A1 | 12/2004 | Gan | |
| 2005/0020007 A1 | 1/2005 | Weber et al. | |
| 2008/0016959 A1 * | 1/2008 | Nakano et al. | G01F 1/6842 |
| | | | 73/204.26 |
| 2008/0163683 A1 * | 7/2008 | Becke et al. | G01F 1/684 |
| | | | 73/431 |
| 2009/0158838 A1 * | 6/2009 | Speldrich | G01F 15/006 |
| | | | 73/272 R |
| 2010/0078753 A1 | 4/2010 | Mehregany et al. | |
| 2010/0084752 A1 | 4/2010 | Horning et al. | |
| 2010/0089146 A1 * | 4/2010 | Morita et al. | G01F 1/6842 |
| | | | 73/204.26 |
| 2012/0174680 A1 | 7/2012 | Wade et al. | |
| 2013/0055821 A1 * | 3/2013 | Bentley et al. | G01L 9/0054 |
| | | | 73/721 |
| 2013/0139584 A1 * | 6/2013 | Qasimi et al. | G01F 1/6842 |
| | | | 73/204.21 |
| 2013/0247690 A1 | 9/2013 | Wade | |

FOREIGN PATENT DOCUMENTS

| | | |
|---|---|---|
| CN | 205749545 U | 11/2016 |
| DE | 19902450 A1 | 8/2000 |
| EP | 0137687 A1 | 4/1985 |
| EP | 0131318 B1 | 12/1991 |
| EP | 0563213 B1 | 6/1995 |
| EP | 0696725 B1 | 12/1999 |
| EP | 1094306 A1 | 4/2001 |
| EP | 1365216 A1 | 11/2003 |
| EP | 1615000 A1 | 1/2006 |
| EP | 1615005 A1 | 1/2006 |
| EP | 1116939 B1 | 4/2009 |
| EP | 1348937 B1 | 7/2014 |
| JP | 07159215 A | 6/1995 |
| JP | 2014149270 A | 8/2014 |
| WO | 38/36247 A1 | 8/1998 |
| WO | 98/36247 A1 | 8/1998 |
| WO | 00/37895 A1 | 6/2000 |
| WO | 01/84087 A1 | 11/2001 |
| WO | 2004/088255 A2 | 10/2004 |
| WO | 2007/134206 A2 | 11/2007 |

OTHER PUBLICATIONS

Tadigadapa et al., "Applications of High-Performance MEMS Pressure Sensors Based on Dissolved Wafer Process," Integrated Sensing Systems, Inc., 6 pages, Prior to Sep. 27, 2005.

Xiao et al., "A Pressure Sensor Using Flip-Chip on Low-Cost Flexible Substrate," IEEE 51$^{st}$ Electronic Components and Technology Conference, 6 pages, May 29-Jun. 1, 2001.

Chow et al., "Process Compatible Polysilicon-Based Electrical Through-Wafer Interconnects in Silicon Substrates," Journal of Microelectromechanical Systems, vol. 11, No. 6, pp. 631-640, Dec. 2002.

Mehra et al., "Through-Wafer Electrical Interconnect for Multilevel Microelectromechanical System Devices," J. Vac. Sci. Technology B, vol. 18, No. 5, pp. 2583-2589, Sep./Oct. 2000.

Ok et al., "High Density, High Aspect Ratio Through-Wafer Electrical Interconnect Vias for MEMS Packaging," IEEE Transactions on Advanced Packaging, vol. 26, No. 3, pp. 302-309, Aug. 2003.

Wu et al., "A Through-Wafer Interconnect in Silicon for RFICs," IEEE Transactions on Electron Devices, vol. 51, No. 11, pp. 1765-1771, Nov. 2004.

China Patent Application 201620090699.X, Notification of Amendment; dated May 17, 2016, 4 pages.

China Patent Application 201620090699.X, Notification to Grant Patent Right; dated Aug. 18, 2016, 4 pages.

China Patent Application 201621167277.4, Notification of Amendment; dated Apr. 25, 2017, 4 pages.

* cited by examiner

SENSOR ASSEMBLY

TECHNICAL FIELD

The disclosure relates generally to sensors and methods for making such sensors.

BACKGROUND

Sensors are commonly used to sense properties of a fluid. Sensors are used in a wide variety of applications including residential, industrial, automotive, military, aeronautical, space, as well as countless other applications. Example sensors include flow sensors, pressure sensors, thermal conductivity sensors, temperature sensors, humidity sensors, and chemical sensors.

Many sensors are configured to provide a channel to deliver fluid to an appropriate sensor device. In some cases, the sensor device has electric bond pads that can become corroded or damaged if exposed to the sensed fluid. What would be desirable is a robust sensor design that can be relatively easily assembled and that defines a channel for delivering fluid to a sensor device while protecting the electric bond pads of the sensor device from the fluid.

SUMMARY

This disclosure relates generally to sensors and methods for making such sensors. An illustrative sensor may include a substrate that has a first side and an opposing second side. The substrate may define a flow channel that extends through the substrate from the first side to the second side. The substrate may further include a plurality of bond pads on the second side of the substrate. A first housing may provide a fluid inlet and a fluid outlet to/from the flow channel. The first housing may be disposed along the first side of the substrate and may be configured to permit at least some fluid to flow from the fluid inlet to the fluid outlet along at least part of the flow channel of the substrate. In some cases, a second housing may be disposed along the second side of the substrate, and may be configured to provide a seal around the flow channel. A sense die may be disposed between the second housing and the second side of the substrate. The sense die may include a sensing side facing the second side of the substrate with a sense element in registration with the flow channel defined by the substrate. The sense die may further include a plurality of bond pads on the sensing side that are in registration with, and bump bonded to, the plurality of bond pads on the second side of the substrate. In some cases, an adhesive or other material may be disposed between the sensing side of the sense die and the second side of the substrate. The adhesive or other material may help isolate the plurality of bond pads on the sensing side of the sense die from the fluid in the flow channel. In some cases, the adhesive or other material is a non-conductive adhesive or other material.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. References to "over," "under," "top," and "bottom," etc., are relative terms and are made herein with respect to the drawings and do not necessarily correspond to any particular orientation in actual physical space. The description and drawings show several examples that are meant to be illustrative of the claimed disclosure.

Figure 1:
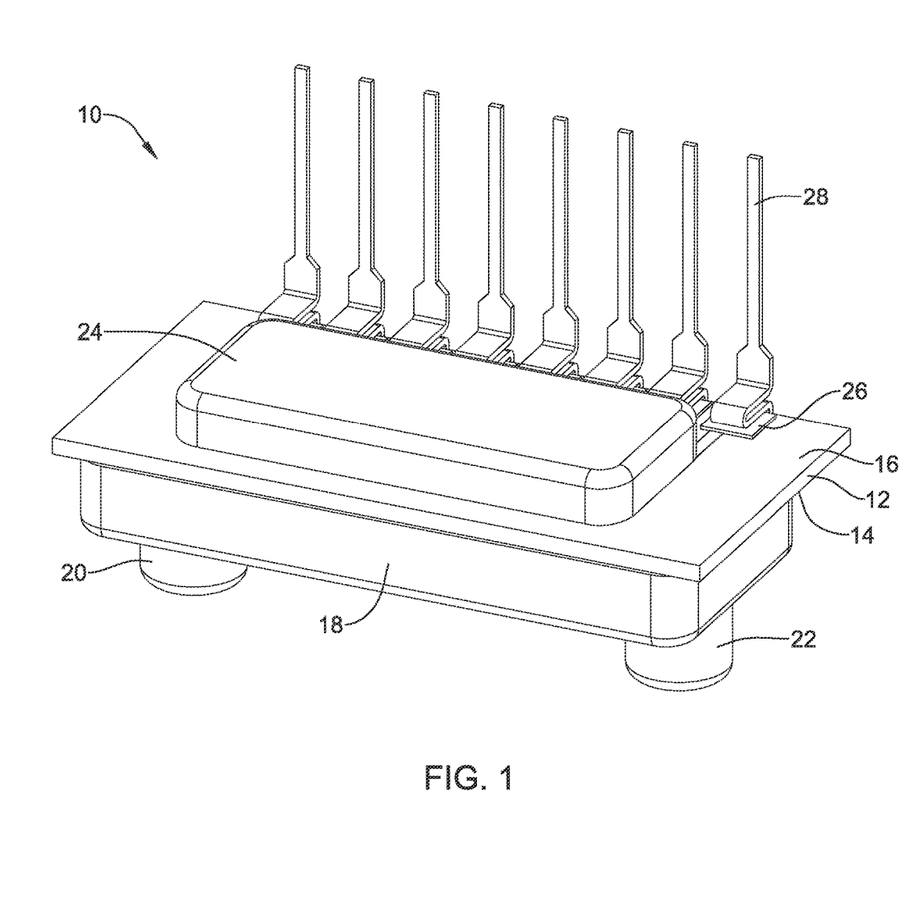
FIG. 1 is a perspective view of an illustrative sensor.

FIG. 1 is a perspective view of an illustrative sensor 10. While the sensor 10 will be described herein as being a flow sensor, it will be appreciated that sensor 10 may be any suitable type of sensor, including a pressure sensor, a thermal conductivity sensor, a temperature sensor, a humidity sensor, a chemical sensor, and/or any combination of these or other sensors. As seen in FIG. 1, the illustrative sensor 10 includes a substrate 12 having a first side 14 and a second side 16. A first housing 18 is disposed along the first side 14 of the substrate 12 and defines a fluid inlet 20 and a fluid outlet 22. It will be appreciated that in this case, definition of which opening forms the fluid inlet 20 and which opening forms the fluid outlet 22 is arbitrary. Additional details regarding the first housing 18 will be discussed subsequently with respect to FIG. 6. The illustrative sensor 10 also includes a second housing 24 that is disposed along the second side 16 of the substrate 12. In some embodiments, as illustrated, a plurality of wiring pads 26 are disposed on the second side 16 of the substrate 12 in order to accommodate a plurality of electrical connectors 28 that are secured relative to the plurality of wiring pads 26.

Figure 2:
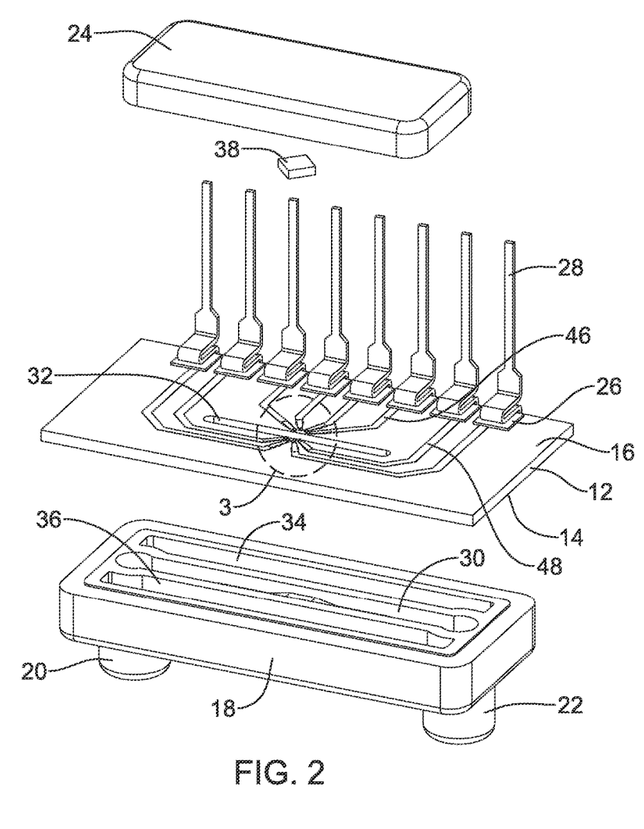
FIG. 2 is an exploded view of the illustrative sensor of FIG. 1.

FIG. 2 is an exploded view of the illustrative sensor 10, providing further details regarding the construction of the sensor 10. The first housing 18 may, as illustrated, include a flow path 30 that extends from the fluid inlet 20 to the fluid outlet 22. As will be appreciated, at least a portion of the flow path 30 is in alignment with a flow channel 32 such that fluid entering the fluid inlet 20 may flow through the flow path 30 and into and through the flow channel 32 in the substrate 12 before exiting through the fluid outlet 22. The flow channel 32 in the substrate 12 extends through the substrate 12 from the first side 14 to the second side 16. In some instances, the first housing 18 may include additional flow paths 34, 36 that may accommodate a portion of the fluid flowing between the fluid inlet 20 and the fluid outlet 22, which may reduce the fluid velocity in the flow path 30. In some cases, reducing the relative flow through the flow path 30 and thus the flow channel 32 may improve accuracy by, for example, reducing fluid velocity and/or turbulence adjacent the sense die 38. In some cases, fluid may not flow through the additional flow paths 34, 36. It will be appreciated that the first housing 18 may be customized in this regard to better accommodate a desired end use.

Figure 3:
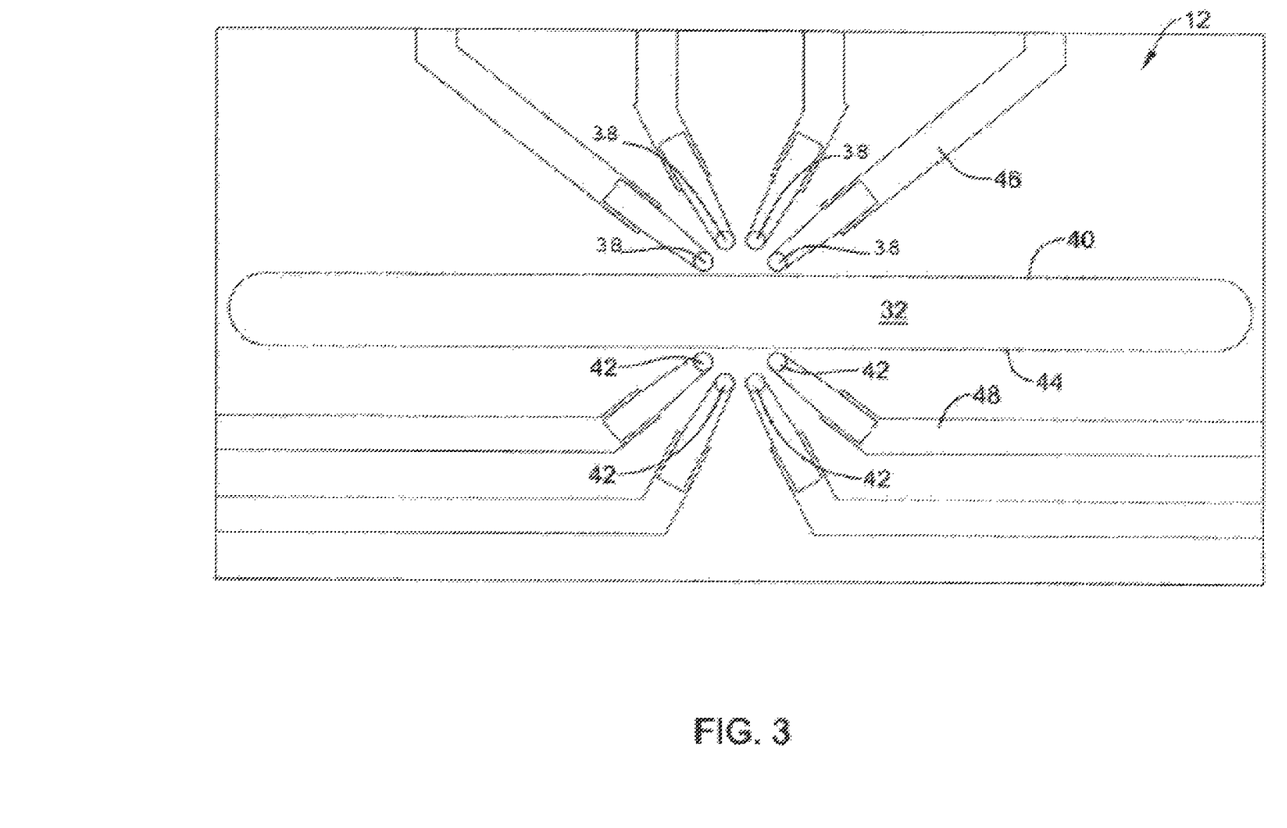
FIG. 3 is an enlarged top view of a portion of the illustrative sensor of FIG. 2, showing the bond pads and wiring traces on the substrate.

The sense die 38 is shown disposed between the second housing 24 and the second side 16 of the substrate 12. The second side 16 of the substrate 12 may include structure that permits mechanical and electrical attachment of the sense die 38 to the second side 16 of the substrate 12, which is best illustrated in FIG. 3, which is an enlargement of a portion of FIG. 2. In FIG. 3, a first number of bond pads 39 are disposed on the second side 16 of the substrate 12, along a first side 40 of the flow channel 32 and a second number of bond pads 42 are disposed on the second side 16 of the substrate 12, along a second side 44 of the flow channel 32. It will be appreciated, therefore, that this arrangement of bond pads 39, 42 permit the sense die 38 to straddle the flow channel 32. In some cases, the bond pads 39, 42 may be formed of materials such as gold, copper, silver, palladium silver or other conductive materials and/or plating.

As can be seen, each of a first number of wiring traces 46 are electrically coupled to a corresponding one of the first number of bond pads 39 and extend along the second side 16 of the substrate 12 to a corresponding wiring pad 26 (FIG. 1). Similarly, each of a second number of wiring traces 48 are electrically coupled to a corresponding one of the second number of bond pads 42 and extend along the second side 16 of the substrate 12 to a corresponding wiring pad 26. In some cases, the wiring traces 46, 48 may be formed of materials such as gold, copper, silver, palladium silver or other conductive materials and/or plating.

Figure 4:
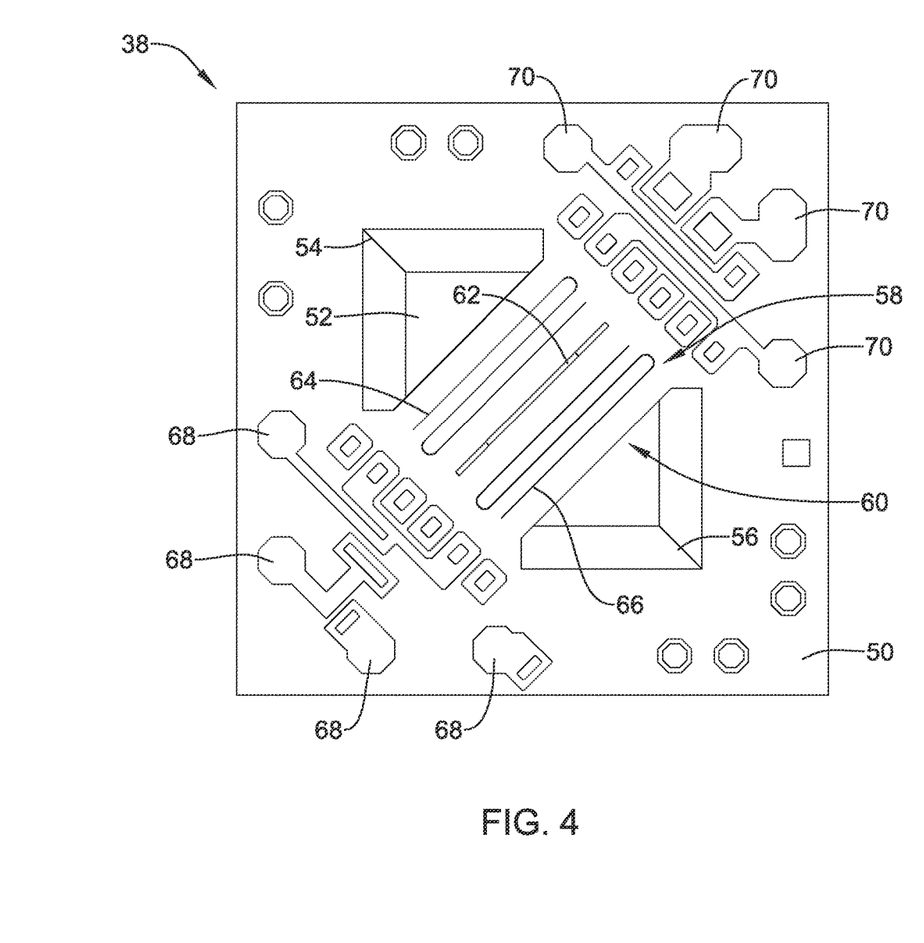
FIG. 4 is a view of an illustrative sense die, which in the example shown in FIG. 4 is a sensing side of an illustrative flow sense die.

FIG. 4 shows an illustration of a sensing surface 50 of the illustrative sense die 38. It will be appreciated that once the sensor 10 has been assembled, the sensing surface 50 will face the second surface 16 of the substrate 12 and will be secured relative thereto. The substrate 12 may be formed of any suitable material, and may be formed in any suitable manner. In some instances, suitable materials for forming the substrate 12 may include ceramics such as aluminum oxide, glass-reinforced epoxy laminate, and/or any other suitable material or material combinations, as desired. In some cases, the sense die 38 may be a semiconductor such as silicon. The material used to form the substrate 12 may, for example, be selected such that the substrate 12 has a similar coefficient of thermal expansion (CTE) to that of the sense die 38.

In the example shown, the sensing surface 50 includes a recess 52 that may be formed using any suitable technique, including but not limited to machining, laser cutting or etching. The recess 52 extends from a first end 54 to a second end 56, forming a bridge 58 that overlies the recess 52. As will be illustrated in FIG. 5, the recess 52 may be aligned with the flow channel 32 in the substrate 12. At least a portion of fluid entering the fluid inlet 20 (FIG. 1) will flow through the flow path 30, through the flow channel 32 and into the recess 52. The fluid may flow over both sides of the bridge 58.

A sense element generally shown at 60 may be disposed on the bridge 58. In this configuration, the bridge 58 and sense element 60 may be thermally coupled to the fluid. Also, the bridge 58 and sense element 60 may be relatively thermally isolated from the remainder of the sense die 38. This configuration may be particularly suitable for a thermal anemometer type flow sensor.

Depending on the intended use of the sensor 10, the sense element 60 may take a variety of forms, and any variety of structures may be formed on or otherwise disposed on the bridge 58. In some instances, such as for a flow sensor, the sensor 10 may include a heater 62, a first temperature sensor 64 that is upstream (relative to fluid flow direction) of the heater 62 and a second temperature sensor 66 downstream of the heater 62. In some instances, the first temperature sensor 64 and/or the second temperature sensor 66 may be resistors, although this is not required. It will be appreciated that reference to upstream and downstream are relative, as the sense die 38 may be mountable in a pair of orientations that are about 180 degrees apart.

In some cases, the first and second temperature sensors 64, 66 may formed via thin film deposition or sputtering. In some cases, the first and second temperature sensors 64, 66 may be silicide (Pt, Au, Pd, Mo, Ti, W, Hf, Zr, Cr, or combinations thereof) resistors, but this is not required. The first and second temperature sensors 64, 66 may be formed of materials such as silicon, Permalloy, platinum and/or nichrome. In some cases, the first and second temperature sensors 64, 66 may be provided along a meandering path to extend the effective length.

Regardless of the type of sense die 38, the sensing surface 50 may include a first number of bond pads 68 and a second number of bond pads 70. In some cases, the bond pads 68, 70 may be formed of materials such as silicon, gold, TiW, aluminum, aluminum-copper, copper and/or silver. In the example shown, the first number of bond pads 68 and the second number of bond pads 70 may be electrically coupled to one or more of the structures formed on, in or under the bridge 58, such as the heater 62 and the first and second temperature sensors 64, 66. Some of the wiring traces are excluded from the drawing in order to not obscure the drawing.

The first number of bond pads 68 are positioned to align with the first number of bond pads 39 formed on the first side 40 of the flow channel 32, and the second number of bond pads 70 are positioned to align with the second number of bond pads 42 formed on the second side 42 of the flow channel 32. This is illustrated, for example in FIG. 5, which is looking up through the substrate 12 toward the sense die 38, with the bond pads 68, 70 of the sensing surface 50 of the sense die 38 visible in combination with the bond pads 39, 42 (in phantom) of the second surface 16 of the substrate 12. As can be seen, and in the example shown, the bond pads 68, 70 of the substrate 12 are in registration with the bond pads 39, 42 of the sense die 38, and the recess 52 in the sense die 38 is in registration with the flow channel 32 of the substrate 12.

Figure 5:
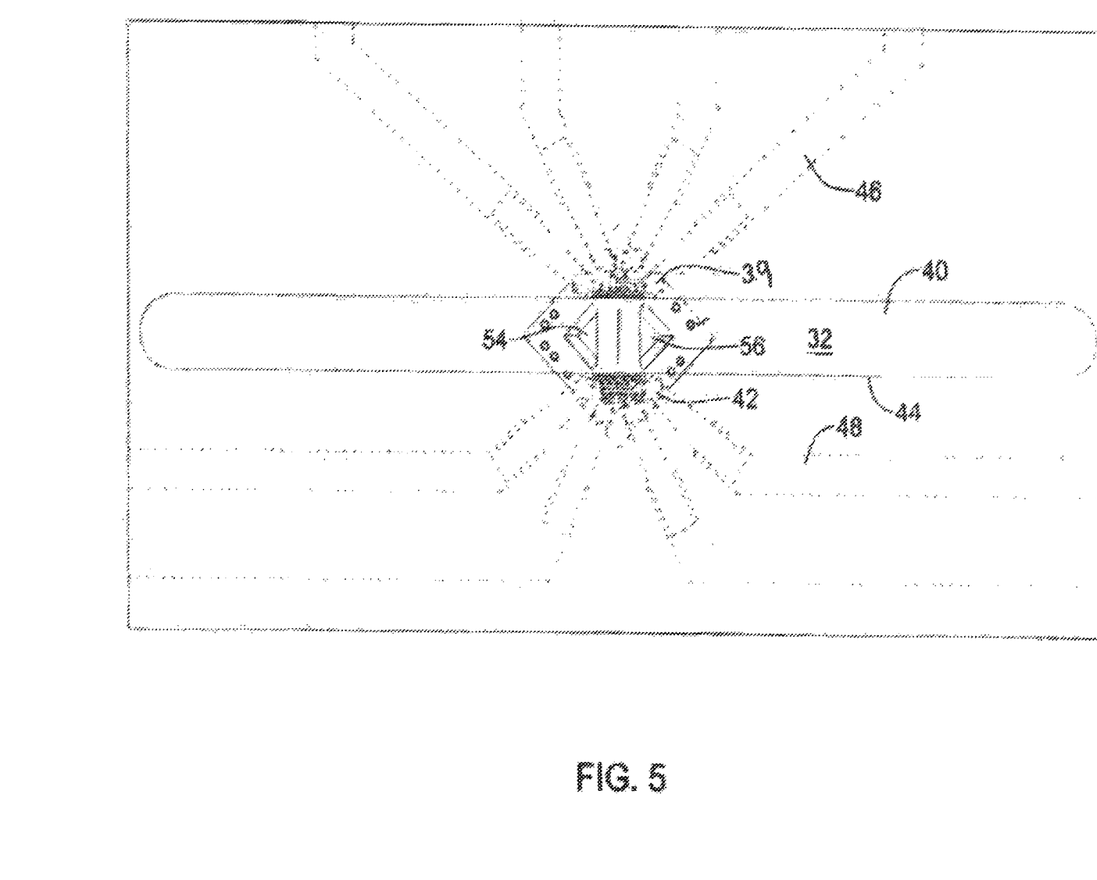
FIG. 5 is a view of the sense die of FIG. 4, disposed in registration with the bond pads and wiring traces of FIG. 3.

In some instances, the sense die 38 may be secured to the substrate 12 via bump bonding. In bump bonding, bumps, which for example may be small gold balls, are formed on either the bond pads 39, 42 or the bond pads 68, 70. In some instances, bumps may be formed on both of the bond pads 39, 42 and the bond pads 68, 70. The sense die 38 may then be inverted onto the second surface 16 of the substrate 12 such that the bond pads on both pieces are in alignment. Heat and/or vibration, such as ultrasonic energy, may be applied, along with optional compression, to form the bump bonds between the bond pads 39, 42 and the bond pads 68, 70. This provides a mechanical attachment of the sense die 38 to the substrate 12 as well as an electrical connection between the individual bond pads 39, 42 and corresponding bond pads 68, 70.

Figure 6:
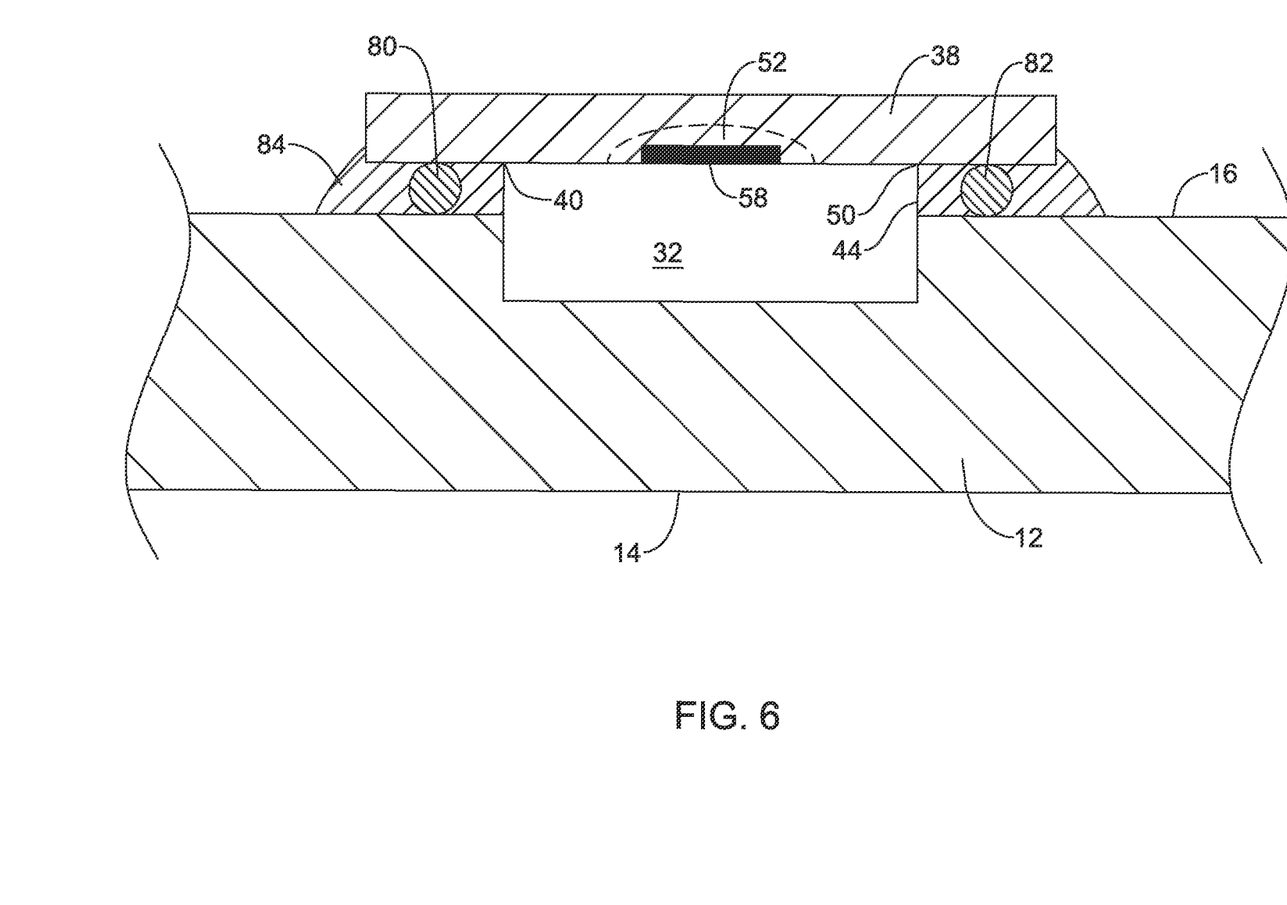
FIG. 6 is a schematic cross-sectional view of the illustrative sensor of FIG. 1.

In some instances, an adhesive or other material may be applied to help provide a seal between the sensing surface 50 of the sense die 38 and the second side 16 of the substrate 12, as schematically illustrated in FIG. 6. In FIG. 6, a first gold ball 80 is schematically shown adjacent the first side 40 of the flow channel 32 and a second gold ball 82 is schematically shown adjacent the second side 44 of the flow channel 32. The word "ball" does not mean that the first gold ball 80 and/or second gold ball 82 must be spherical. Instead, they may assume any desired shape. It will be appreciated that the sensor 10 may include additional bump bonds, although only two are schematically illustrated in FIG. 6. An adhesive 84 or other material is shown interposed between the sensing surface 50 of the sense die 38 and the second side 16 of the substrate 12. In some embodiments, the adhesive 84 or other material may flow via capillary action from a perimeter of the sense die 38 and fill the gap between the sensing surface 50 of the sense die 38 and the second side 16 of the substrate 12, but may stop and not flow into the flow channel 32 because of the relatively wider gap represented by the flow channel 32. It will be appreciated that the adhesive 84 or other material may help to mechanically attach the sense die 38 to the substrate 12, and/or to protect the bump bonds and wiring traces 46, 48 from potentially corrosive fluids flowing through the sensor 10. In some cases, the adhesive 84 or other material may flow around and encapsulate the bump bonds. In some cases, the adhesive 84 or other material may be a non-conductive adhesive or other material.

Figure 7:
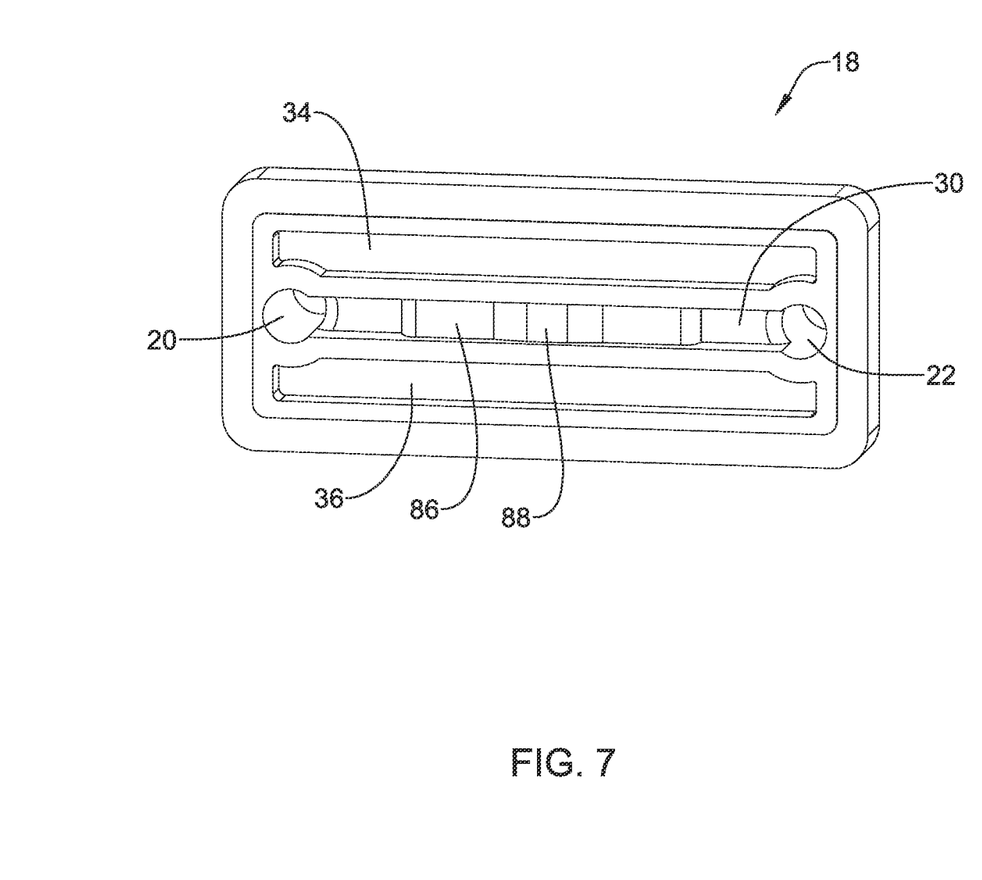
FIG. 7 shows a first housing forming part of the illustrative sensor of FIG. 1.

FIG. 7 provides another view of the first housing 18. In some cases, as noted herein, the flow paths 34, 36 may be fluidly coupled to the flow path 30, but this is not required. In some cases, as illustrated, the flow path 30 may include one or several steps 86, 88 that serve to reduce the effective depth of the flow path 30 toward the sense die. It will be appreciated that in some embodiments, the one or several steps 86, 88 may be absent, or even inverted, depending on the intended use of the sensor 10.

Figure 8:
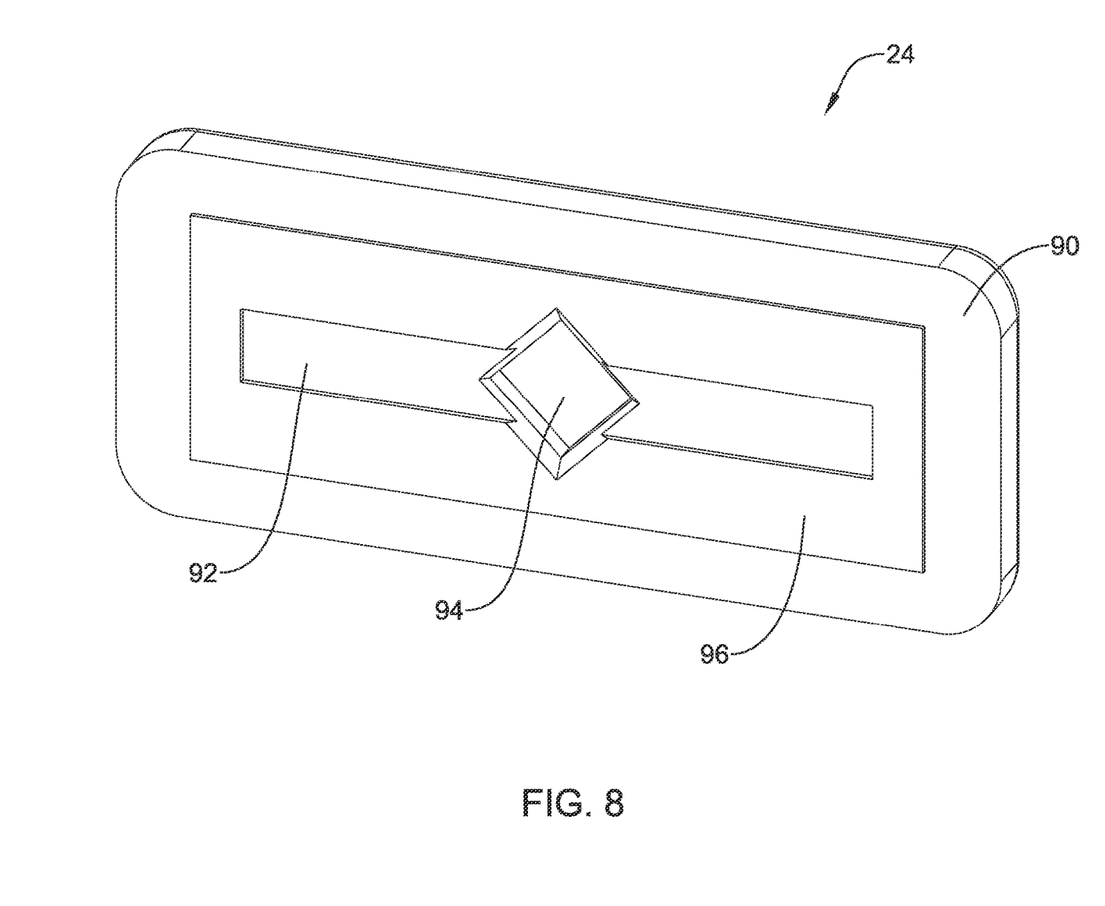
FIG. 8 shows a second housing forming part of the illustrative sensor of FIG. 1.

FIG. 8 provides another view of the second housing 24. The second housing 24 may have a surface 90 that is intended to mate with the second side 16 of the substrate 12. A first recess 92 may be formed within the surface 90, which may be intended to at least substantially align with the flow channel 32 (FIG. 2). A second, deeper, recess 94 is sized and configured to fit around the sense die 38. In some instances, the second housing 24 may include a profile 96 that may be configured to help seal between the second housing 24 and the second side 16 of the substrate 12. In this instance, it is not intended for there to be significant fluid flow behind the sense die 38, along a back surface opposite of the sensing surface 50.

Figure 9:
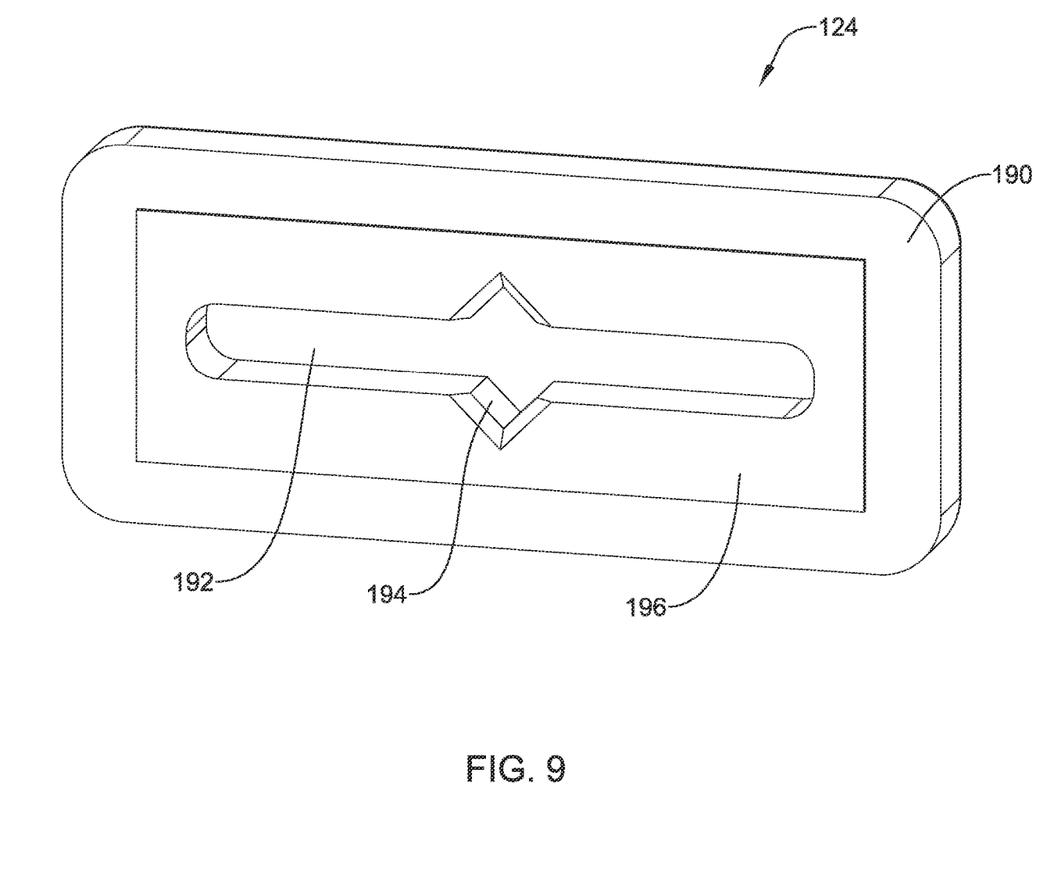
FIG. 9 shows an alternate second housing suitable for forming part of the illustrative sensor of FIG. 1.

FIG. 9 provides a view of an alternate second housing 124. The alternate second housing 124 has a surface 190 that is intended to mate with the second side 16 of the substrate 12. A first recess 192 is formed within the surface 190 and is intended to at least substantially align with the flow channel 32 (FIG. 2). The first recess 192 is deeper but not all the way through the alternate second housing 124. The first recess 192 may be configured to permit fluid flow behind the sense die 38, along a back surface opposite of the sensing surface 50. A second recess 194 is shown sized and configured to fit around the sense die 38. In some instances, the alternate second housing 124 may include a profile 196 that may be configured to help seal between the alternate second housing 124 and the second side 16 of the substrate 12.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A sensor comprising:
   a substrate including a first side and an opposing second side, the substrate defining a flow channel that extends through the substrate from the first side to the second side, the flow channel having a length, a width and a depth, wherein the length is elongated relative to the width, and the depth is defined by a thickness of the substrate, the substrate further including a plurality of bond pads on the second side of the substrate;
   a first housing providing a fluid inlet and a fluid outlet, the first housing disposed along the first side of the substrate and configured to permit at least some fluid to flow from the fluid inlet to the fluid outlet along at least part of the flow channel of the substrate;
   a second housing disposed along the second side of the substrate and configured to provide a seal to the flow channel along the second side of the substrate;
   a sense die disposed between the second housing and the second side of the substrate, the sense die including a sensing side facing toward the second side of the substrate with a sense element in registration with the flow channel, the sense die further including a plurality of bond pads on the sensing side that are in registration with, and bump bonded to, the plurality of bond pads on the second side of the substrate, the sense die extending across the width of the flow channel;
   the first housing, the second housing and the substrate each defining at least part of a sense flow path that extends between the fluid inlet and the fluid outlet of the first housing and past the sensing side of the sense die so that a flow through the sense flow path can be sensed by the sense element of the sense die, the sense flow path is defined at least in part by:
   the flow channel defined by the substrate;
   a flow path defined by the first housing, the flow path extending along at least a majority of the flow channel of the substrate and configured to extend the effective depth of the sense flow path along at least a majority of the flow channel of the substrate beyond the depth provided by the flow channel of the substrate;
   the second housing closing the flow channel of the substrate along the second side of the substrate; and
   wherein a non-conductive adhesive is positioned to contact the second side of the substrate and the sense die, and to encapsulate the bump bonds.

2. The sensor of claim 1, wherein the first housing defines one or more other flow paths that extends between the fluid inlet and the fluid outlet of the first housing, the one or more other flow paths extend in parallel with the sense flow path.

3. The sensor of claim 2, wherein the one or more other flow paths are arranged in parallel with and fluidly isolated from the sense flow path along at least a majority of the length of the sense path.

4. The sensor of claim 1, further comprising a plurality of wiring traces extending from the plurality of bond pads on the second side of the substrate and along the second side of the substrate.

5. The sensor of claim 1, wherein the sense die includes a bridge extending over a recess formed in the sensing side of the sense die, the bridge including the sense element.

6. The sensor of claim 5, wherein the sense element includes a heater.

7. The sensor of claim 5, wherein the sense element includes a heater, an upstream temperature sensor upstream of the heater, and a downstream temperature sensor downstream of the heater.

8. The sensor of claim 7, wherein the sense die includes a back side opposite the sensing side with side walls extending between the sensing side and the back side, the second housing including an outer side and an opposite inner side with the inner side facing the substrate, the inner side defining a recess that is configured to receive the back side and at least part of the side walls of the sense die.

9. The sensor of claim 1, wherein each of the plurality of bond pads on the sensing side are bump bonded to a corresponding one of the plurality of bond pads on the second side of the substrate via bump bonds that comprise gold.

10. The sensor of claim 1, wherein the flow path defined by the first housing extends the effective depth of the sense flow path such that the effective depth is decreased as the sense flow path approaches the sense element.

11. A sensor having a fluid inlet and a fluid outlet, the sensor comprising:
a substrate defining a flow channel, with a plurality of bond pads adjacent to the flow channel, the flow channel having a length, a width and a depth, wherein the length is elongated relative to the width, and the depth is defined by a thickness of the substrate;
a sense die straddling across the width of the flow channel, the sense die including:
a sensing side facing the substrate, the sensing side having a sense element exposed to the flow channel;
a plurality of bond pads disposed on the sensing side that are arranged to align with the plurality of bond pads of the substrate such that the sense die may be bump bonded with bump bonds to the substrate;
a housing disposed along the substrate and configured to provide a seal around the flow channel, wherein the housing and the substrate collectively define a sense flow path that extends between the fluid inlet and the fluid outlet of the sensor and past the sensing side of the sense die so that a flow through the sense flow path can be sensed by the sense element of the sense die, the sense flow path is defined at least in part by:
the flow channel defined by the substrate;
a flow path defined by the housing, the flow path extending along at least a majority of the flow channel of the substrate and configured to extend the effective depth of the sense flow path along at least a majority of the flow channel of the substrate beyond the depth provided by the flow channel of the substrate; and
wherein a non-conductive adhesive is positioned to contact the second side of the substrate and the sense die, and to encapsulate the bump bonds, wherein the non-conductive adhesive does not extend into the flow channel.

12. The sensor of claim 11, further comprising an adhesive disposed between the sense die and the substrate.

13. The sensor of claim 11, wherein the substrate further includes terminal pads, and conductive traces extending between the bond pads of the substrate to corresponding terminal pads of the substrate.

14. The sensor of claim 11, wherein the flow path defined by the housing extends the effective depth of the sense flow path such that the effective depth is decreased as the sense flow path approaches the sense element.

15. A sensor comprising:
a substrate including a first side and an opposing second side, the substrate defining a flow channel that extends through the substrate from the first side to the second side, the flow channel having a length, a width and a depth, wherein the length is elongated relative to the width, and the depth is defined by a thickness of the substrate, the substrate further including a plurality of bond pads on the second side of the substrate;
a first housing providing a fluid inlet and a fluid outlet, the first housing disposed along the first side of the substrate and configured to permit at least some fluid to flow from the fluid inlet to the fluid outlet along at least part of the flow channel of the substrate;
a second housing disposed along the second side of the substrate and configured to provide a seal to the flow channel along the second side of the substrate;
a sense die disposed between the second housing and the second side of the substrate, the sense die including a sensing side facing toward the second side of the substrate with a sense element in registration with the flow channel, the sense die further including a plurality of bond pads on the sensing side that are in registration with, and bump bonded with bump bonds to, the plurality of bond pads on the second side of the substrate, the sense die straddling across the width of the flow channel;
the first housing, the second housing and the substrate each defining at least part of a sense flow path that extends between the fluid inlet and the fluid outlet of the first housing and past the sensing side of the sense die so that a flow through the sense flow path can be sensed by the sense element of the sense die, the sense flow path is defined at least in part by:
the flow channel defined by the substrate;
a flow path defined by the first housing, the flow path extending along at least a majority of the flow channel of the substrate and configured to extend the effective depth of the sense flow path along at least a majority of the flow channel beyond the depth provided by the flow channel of the substrate, the flow path being stepped such that the effective depth of the sense flow path is decreased as the sense flow path approaches the sense element and is increased as the sense flow path departs from the sense element; and.

16. The sensor of claim 15, further comprising an adhesive disposed between the sensing side of the sense die and the second side of the substrate.

17. The sensor of claim 16, wherein the adhesive does not extend into the flow channel.

18. The sensor of claim 15, further comprising a plurality of wiring traces extending from the plurality of bond pads on the second side of the substrate and along the second side of the substrate.

19. The sensor of claim 15, wherein the sense die includes a bridge extending over a recess formed in the sensing side of the sense die, the bridge including the sense element.

* * * * *